L. STEVENS.
Gas-Furnaces.

No. 141,179.

3 Sheets--Sheet 1.

Patented July 22, 1873.

L. STEVENS.
Gas-Furnaces.
No. 141,179.
3 Sheets--Sheet 2.
Patented July 22, 1873.
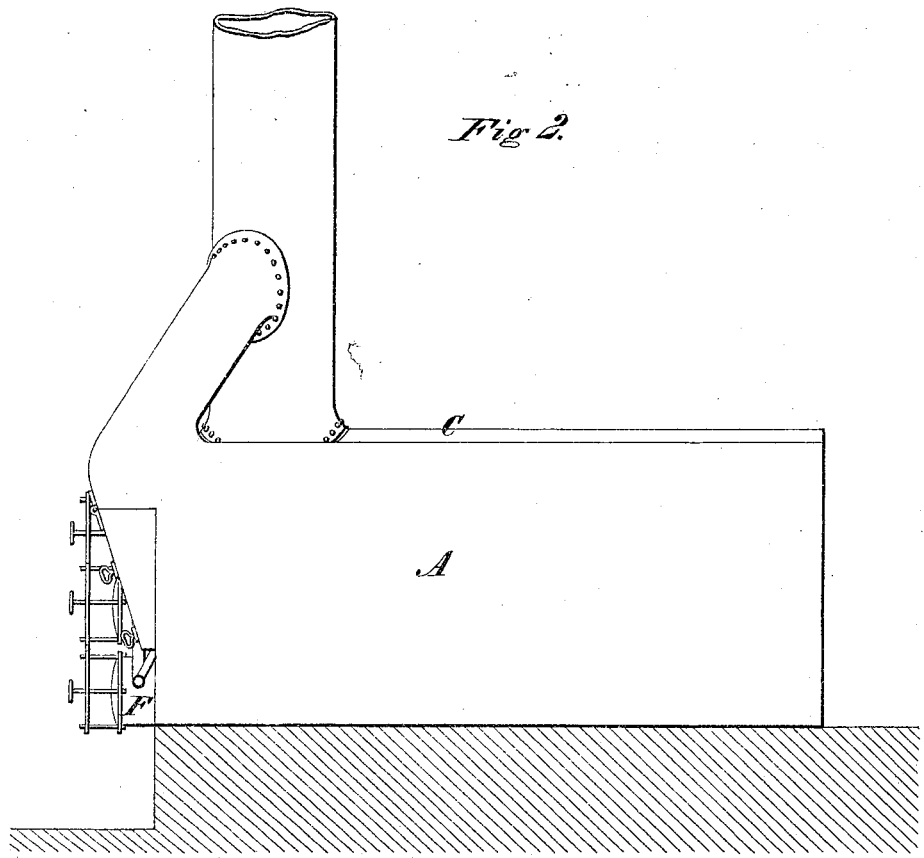
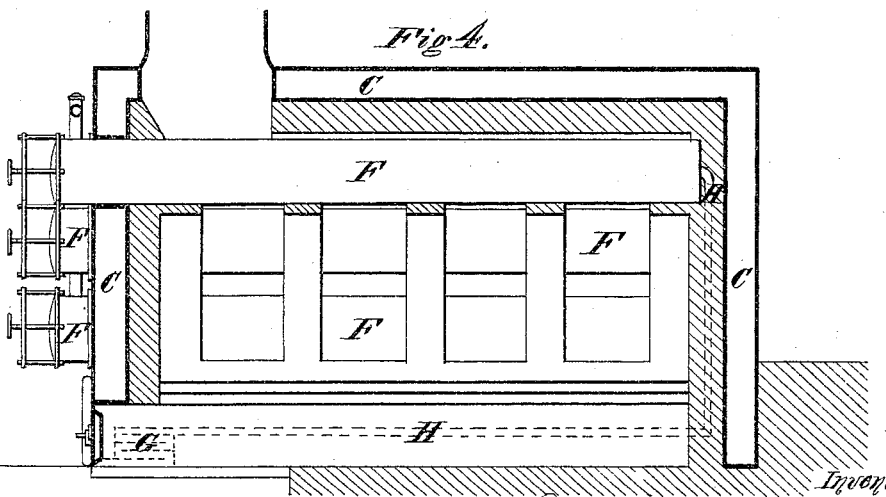

L. STEVENS.
Gas-Furnaces.
No. 141,179.
3 Sheets--Sheet 3.
Patented July 22, 1873.
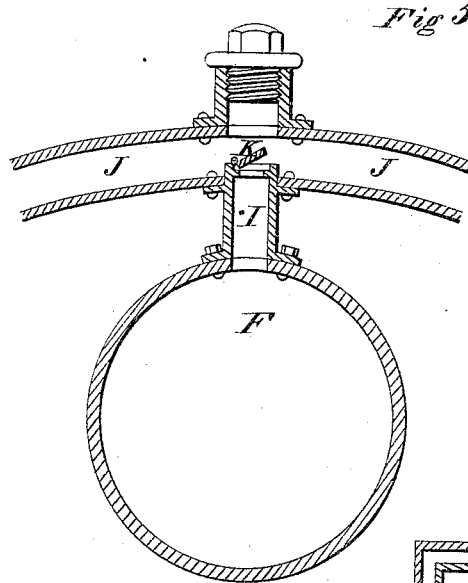
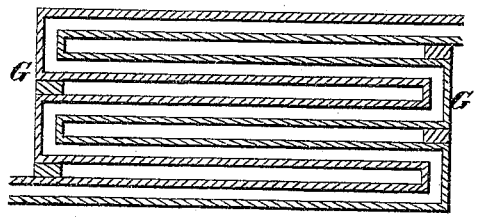
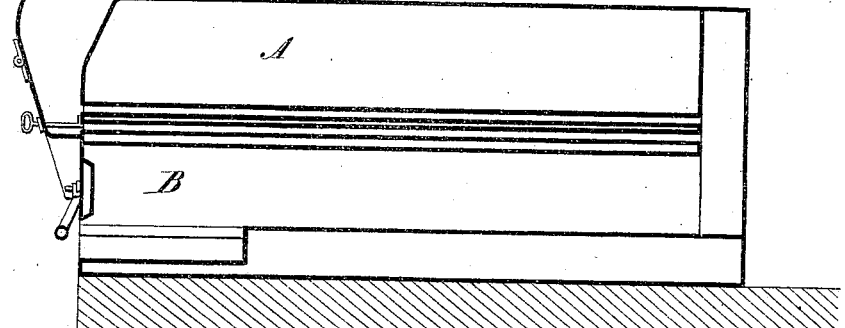

UNITED STATES PATENT OFFICE.

LEVI STEVENS, OF WASHINGTON, DISTRICT OF COLUMBIA.

IMPROVEMENT IN GAS-FURNACES.

Specification forming part of Letters Patent No. 141,179, dated July 22, 1873; application filed January 21, 1873.

*To all whom it may concern:*

Be it known that I, LEVI STEVENS, of Washington city, District of Columbia, have invented a process of forming carbonic oxide from oxyhydrogen vapor or steam, and an apparatus for utilizing the same for heating purposes; and I do hereby declare the following description and accompanying drawings are sufficient to enable any person skilled in the art or science to which it most nearly appertains to make and use my said invention without further invention or experiment.

My invention consists in the discovery of the conditions by which carbonic oxide or protoxide of carbon is formed from oxyhydrogen vapors or steam; and my invention further consists in distilling bituminous coal, asphaltum, pine wood, and, in fact, any substance that will distill a carbon or hydrocarbon vapor or gas, which vapor or gas I use in the disintegration of oxyhydrogen vapor or steam; and my invention further consists in the application of carbonic oxide or protoxide thus formed to steam-boilers, furnaces, and all places where heat is required. This is effected by the use of any suitable number of retorts, which are set so as to be heated by the same furnaces which serve for the steam-boilers. These retorts are charged with any suitable or convenient substance which will produce a carbon or hydrocarbon vapor by distillation, and at the proper time superheated steam (from an apparatus also heated by the furnaces) is let in at a temperature at which the carbon is decomposed. Protoxide of carbon and free hydrogen are thus evolved, and the gases thus produced are led by suitable pipes into the furnaces. My invention consists of an apparatus for the manufacture of carbonic oxide or protoxide of carbon by the distillation of bituminous coal, asphaltum, pine wood, and similar substances that will distill a carbon or hydrocarbon vapor, and combining the same with superheated steam, as hereinafter more fully explained.

Figure 1:
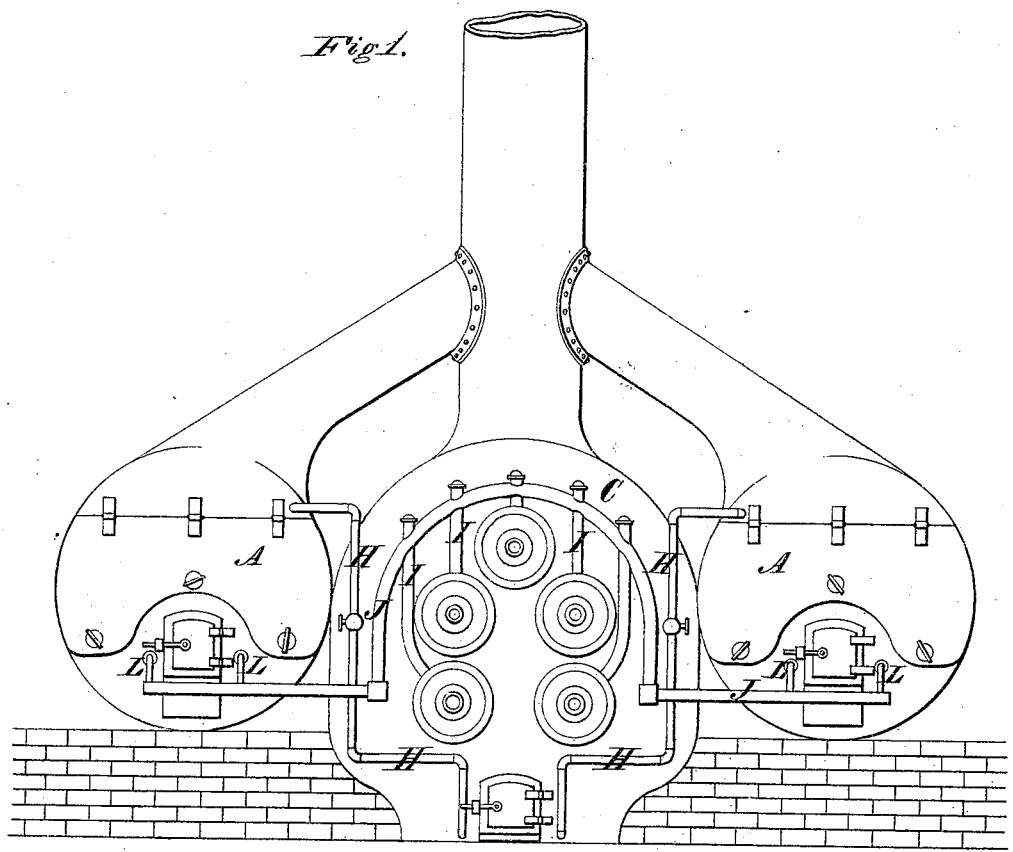
Figure 3:
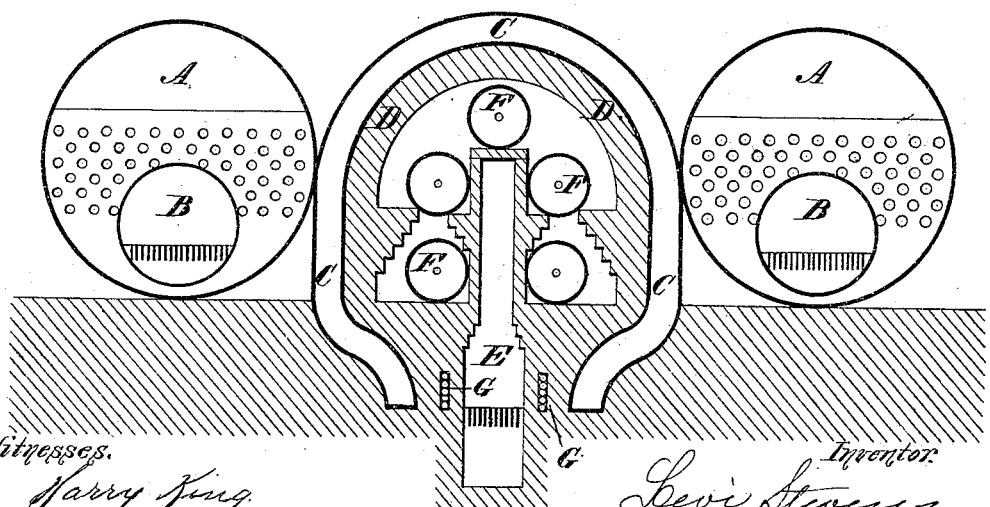

Referring to the accompanying drawings for a more complete explanation of my invention, Figure 1 is a front view of my apparatus, showing three boilers and five retorts, with the connecting-pipes. Fig. 2 is a side elevation of the apparatus. Fig. 3 is a transverse section, showing the interior arrangement of the boilers and retorts. Fig. 4 is a longitudinal section of the apparatus. Fig. 5 is an enlarged section of a retort and one of the stand-pipes, showing the stop-valve. Fig. 6 is an enlarged view of the superheater. Fig. 7 is a section of one of the side boilers A.

A A are two boilers set in masonry, or otherwise suitably placed, if employed for marine purposes, and having fire-places B B, connected with the stack or chimney by flues. C is a central shell between the boilers A A, and having a masonry setting, D, built up in its interior, so as to leave a water and steam space around the masonry, as shown in Figs. 3 and 4. This masonry is so built as to form a fire-place or furnace, E, and the necessary fire spaces and flues for heating the central boiler C and the retorts F F. These retorts are also supported by the masonry D, and may be of any suitable size and number. In the present case I have shown five. A superheater, G, is so placed as also to be heated by the furnace E, and a pipe, H, passes from the superheater beneath the retorts; thence through the fire-spaces, and up behind them to the uppermost retort, where it leads into its rear end and into each of the other retorts. The superheater is made in one single casting, cored out, and not exceeding twenty inches in length, and the passages are bent sharply so as to return upon each other, as shown. This prevents the steam from flowing smoothly, and, by breaking it up at the corners, causes it all to become thoroughly superheated. The width and depth of the superheater may be regulated to suit circumstances. By this construction I am enabled to make my superheater cheap and very effective. Stand-pipes I connect each retort with the main J, and each of these pipes is provided with a stop-valve, K, which prevents the return of the gas from the main J whenever it is necessary to remove the contents of a retort. From the main smaller pipes, L L, lead into the furnaces through an opening, which is made large enough to admit atmospheric air from the outside, the air being drawn in by the vacuum created by the force of the discharge.

Suitable regulating-cocks are provided for all the pipes, so that the proper pressure can be maintained in the retorts, superheater, and at the discharge-openings; and by this or a similar apparatus I am enabled to carry on my process, which is as follows: The boilers being provided with water, fires are built in each of the furnaces until the retorts are of a bright-red heat. The retorts F are then charged with any of the forms of carbon or hydrocarbon most attainable, and which will produce the vapor by distillation. No steam will be needed at first, as the water in the coal will form plenty, but after about fifteen minutes steam must be let into the superheater, where it must reach a temperature equal to that required to decompose the carbon—that is, from 600° to 1,600° Fahrenheit. From the superheater the steam passes, by the pipes before described, to the retorts, and is discharged into them, where decomposition ensues, and results in the production of carbonic-oxide and hydrogen gas. These gases pass from the retorts to the main J, and are conducted by it to the discharge-pipes L. These pipes lead the gases into the furnace at each side of the doors, and oxygen enough from the air is carried in with them, as previously described, (or by blast, if desired,) to cause a complete combustion.

When a coal is employed which will produce coke it will be found desirable and economical to employ the coke in the furnaces in conjunction with the gases, the blast of air being increased in that case so as to supply more oxygen in order to insure perfect combustion of the coke.

As the point of decomposition or formation of the required gases will vary with the different kinds of material used, the temperature of the steam will have to be varied; but I believe that the limits above-mentioned will suffice.

The heat generated by the gases produced by the union of the superheated steam with the vapors by the distillation of hydrocarbon or carbonaceous matter is of a most intense character, and it is, therefore, admirably adapted to the purposes for which it is intended, either for ore, reducing, smelting, reverberatory, and other furnaces, or for the purpose, more particularly herein described, of furnishing a heating medium for marine engines, and it will solve the long-sought problem of utilizing the hydrogen of water as fuel.

Having thus described my invention, what I claim as new, and desire to secure by Letters Patent, is—

1. The arrangement consisting of the boilers A A with their furnaces, and the central boiler C with its furnace and retorts, or an equivalent device, constructed to operate substantially as herein described.

2. The retorts F, arranged as shown, together with the superheater G with its connecting-pipes, substantially as and for the purpose described.

3. In combination with the gas-generator, the main J, and the discharge-pipes L L, the heating-furnaces, the arrangement being substantially such as herein described.

4. The superheater G, consisting of the cast-iron box having the steam-space formed therein, with a series of short angular turns, as shown and described, whereby the current of steam is somewhat retarded in its flow, and is thoroughly broken up to effect a more thorough superheating of it, as set forth.

In witness whereof I hereunto set my hand and seal.

LEVI STEVENS. [L. S.]

Witnesses:
 GEO. H. STRONG,
 C. M. RICHARDSON.